United States Patent Office 3,449,426
Patented June 10, 1969

3,449,426
PHENOTHIAPHOSPHINES
Emile H. Braye, Brussels, Belgium, assignor to Union Carbide Corporation, a corporation of New York
No Drawing. Filed Feb. 17, 1966, Ser. No. 528,093
Int. Cl. C07d *105/02*
U.S. Cl. 260—570.5                                   5 Claims

ABSTRACT OF THE DISCLOSURE

Phenothiaphosphines are prepared by reacting a dihalo phosphine or a dihalo phosphine oxide with a diphenyl sulfide or sulfone, said phenyl containing Li, MgBr, or MgCl substituents in the ortho position. The phenothiaphosphines are useful as intermediates in the preparation of metal chelating compounds, and as fungicidal agents.

---

This application relates to heterocyclic organic compounds which contain phosphorus and sulfur in the heterocyclic ring. More particularly, the invention is directed to phenothiaphosphine compounds and methods for producing such compounds.

Heretofore, heterocyclic compounds have been prepared which have included phosphorus and either oxygen or nitrogen in the heterocyclic ring. See, for example, Doak et al., J. Org. Chem., vol. 29, p. 2382 (1964) and vol. 30, p. 660 (1965) and Haring, Helv. Chim. Acta, vol. 43, p. 1826 (1960). However, compounds which contain both phosphorus and sulfur in a heterocyclic ring have never been described nor have methods been available for producing such compounds. It has now been discovered that phenothiaphosphine compounds exist and can be prepared in good yield.

The phenothiaphosphine compounds of this invention are those represented by the formula:

(A)

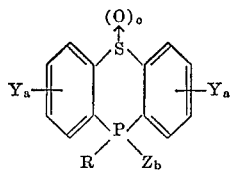

wherein Y represents a functional group substituent on the benzenoid rings or a monovalent hydrocarbon group; $a$ has integral values from zero to 4 inclusive; $b$ has a value of zero or 1; $c$ has a value of zero, 1 or 2; Z is oxygen, sulfur or selenium; and R is a monovalent hydrocarbon group which can have one or more functional group substituents. The compounds of this invention also include the quaternary phosphonium salt derivatives of the compounds of Formula A. Such quaternary phosphonium salts, of course, exist only when $b$ in Formula A is zero.

The process of this invention comprises contacting one or more compounds represented by the formula:

(B) 

with one or more compounds represented by the formula (C) 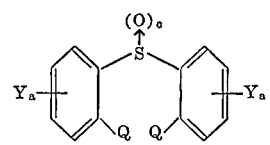

until a compound of the formula D is produced (D) 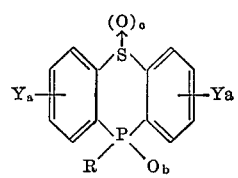

In Formulas B, C and D, the symbols Y, R, $a$ and $b$ have the meanings defined with reference to Formula A, $c$ has the values zero or 2, X represents a halogen, and Q represents Li, MgBr or MgCl. The compounds of Formula A wherein $c$ is one and/or wherein Z is sulfur or selenium are obtained from compounds of Formula D by methods which are described hereinbelow.

A preferred group of phenothiaphosphine compounds of this invention are those defined by the formula (E) 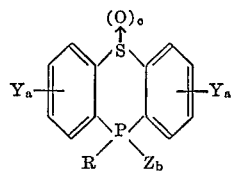

wherein Y represents one of the groups F, Cl, CF$_3$, CN or a monovalent hydrocarbon group containing from 1 to about 6 carbon atoms, $a$ has integral values from 0 to 4 inclusive, $b$ has a value of 0 or 1, $c$ has a value of zero, 1 or 2, Z is oxygen, sulfur or selenium, and R is a monovalent hydrocarbon group containing from 1 to about 10 carbon atoms substituted with from zero to one of the groups F, Cl, Br, I, CN, —NR$_2$',

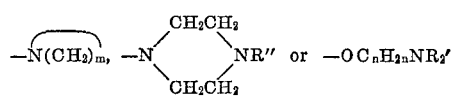

wherein R′ represents hydrogen or an alkyl group containing from 1 to about 6 carbon atoms, R″ represents an alkyl group containing from 1 to about 6 carbon atoms or the group —(CH$_2$CH$_2$O)$_p$CH$_2$CH$_2$OH (where p has integral values from zero to about 3 inclusive), m has integral values of 3 to about 6 and n has integral values from one to about 4 inclusive; together with the quaternary phosphonium salts of the compounds of Formula E which exist when b in Formula E is zero.

Another preferred group of compounds of this invention are those represented by the formula (F) 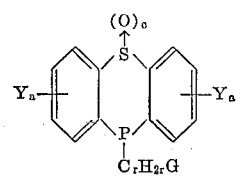

wherein Y has the meaning defined hereinabove with reference to Formula E, a has a value of 0 or 1, c has a value of 0 or 2, r has integral values from 1 to about 6 inclusive, and G represents one of the groups F, Cl, Br, I, CN, NR′$_2$,

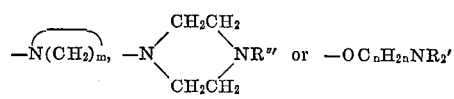

wherein R′, R″, m and n have the meanings defined above with reference to formula E.

The compounds of Formula F are produced by the reaction of compounds of the formula (G)    X$_2$PC$_r$H$_{2r}$G with compounds of the formula (H) 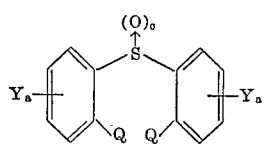

where X is a halogen, Q is Li, MgBr or MgCl, and Y, G, a, b, c and r have the meanings defined with reference to the Formula F.

The various Y and R groups in the above Formulas A through H can be alkyl, aryl, aralkyl, alkaryl, alkenyl, alkynyl, cycloalkyl, cycloalkenyl, and the like groups, for example, the Y and/or R groups can be methyl, tertiary-butyl, hexyl, iso-octyl, decyl, octadecyl, phenyl, phenylethyl, terphenyl, cumyl, mesityl, vinyl, allyl, butyn-2-yl, cyclopentyl, cyclohexenyl or cycloheptyl groups. Also, one or more of the hydrogen atoms of such monovalent hydrocarbon Y and R groups can be replaced with functional group substituents such as halogen, CN, CF$_3$, NO$_2$, —OR‴, —CH(OR‴)$_2$, —C(OR‴)$_3$, —NR$_2$‴ and the like, where R‴ represents a monovalent hydrocarbon group. The Y groups can also be functional groups such as halogen, CN, CF$_3$, NO$_2$, —OR‴, —CH(OR‴)$_2$, —C(OR‴)$_3$, —NR$_2$‴ and the like.

The Y groups in the compounds of Formula A can be any of the ring substituents known for phenothiazine compounds and the R groups in the compounds of Formula A can be any of the nitrogen substituents known for phenothiazine compounds. The wide variety of such substituents is shown by an article on phenothiazines by Schenker and Herbst published in Drug Research, vol. 5, p. 269, Birkhäuser, Basel, 1963.

Also, in the compounds of Formulas A, C, D, E, F and H the values of the integers a and the structure of the Y groups can be the same or different throughout a single molecule.

In carrying out the process of this invention the compounds of Formulas B and G can be contacted with the compounds of Formulas C and H by any convenient procedure, for example, by mixing together in a conventional reaction vessel, or by introducing separate streams of the reactant materials into a tubular reactor which permits continuous operation of the process.

It is preferable to carry out the process of this invention by mixing the reactants in an inert liquid organic solvent. Suitable solvents include hydrocarbons such as petroleum ether, cyclohexane, 2-ethylhexane, benzene, toluene, xylene and the like, and ethers such as diethyl ether, diisopropyl ether, methylbutyl ether, dioxane, tetrahydrofuran, ethylene glycol dimethyl ether, diethylene glycol dimethyl ether, and the like. A preferred class of solvents are the ether solvents.

The process of this invention can be conveniently carried out over a relatively wide range of temperatures, for example, temperatures from —80° C. or below up to 100° C. or above. A particularly preferred and convenient temperature range is from about —30° C. to about 65° C.

The process of this invention is conveniently carried out at normal atmospheric pressure and no particular advantage is to be gained by the use of elevated or reduced pressures.

The ratio of the reactant compounds in the process of this invention is not critical. However, it has been found most convenient to mix the compounds of Formulas B and G with compounds of Formulas C and H in about a 1:1 mole ratio.

The product compounds of Formulas D and F are produced in recoverable yields in times which vary from about 5 minutes to about 4 hours depending upon the reaction conditions. When the reaction temperature is maintained in the range of —30° C. to 65° C. good yields of the product compounds are obtained in reaction times on the order of one hour. The best yields of the product compounds of Formulas D and F are obtained when the process of this invention is carried out under anhydrous conditions and under an inert atmosphere of argon, helium, neon or the like.

The compounds of this invention can be separated from the reaction mixture by conventional organic chemistry techniques. Several of these techniques are illustrated in the specific examples hereinbelow.

Compounds of this invention (compounds of Formulas D and F) and the various compounds of Formulas B, C, G and H as used in the process of this invention are illustrated by Table I hereinbelow. This table illustrates various embodiments of the process and compositions of this invention in which typical reactants of Formula B or G (column 1 of the table) are contacted with typical reactants of Formula C or H, column 2 of the table) to give typical compounds of Formula D or F column 3 of the table). Of course, the compounds of Formulas D and F are also illustrative of the compounds defined by Formulas A and E.

Throughout the present specification and claims, including Table I, the symbols C$_6$H$_5$, C$_6$H$_4$, C$_2$H$_5$, t-C$_4$H$_9$, C$_6$H$_{13}$, and $C_5H_9$ represent, respectively, the phenyl, p-phenylene, ethyl, tertiary-butyl, n-hexyl and cyclopentyl groups.

2 or 1 can be converted to compounds wherein $c$ is 1 or zero by treatment with conventional reducing agents.

TABLE I

| Reactant (1) | Reactant (2) | Product |
|---|---|---|

In the reaction of compounds of Formulas B and G where $b$ is zero with compounds of Formula G or H, the products are compounds of this invention in which $b$ is zero. These products can be converted to the corresponding compounds in which $b$ is one by reaction with an oxidizing agent such as hydrogen peroxide. Similarly, the reaction of compounds of Formula B or G where $b$ is one with compounds of Formula C or H gives compounds of this invention where $b$ is one. These compounds can be converted to the corresponding compounds where $b$ is zero by reaction with a reducing agent such as lithium aluminum hydride.

In a similar manner, compounds of this invention where $c$ is zero or 1 can be converted to compounds wherein $c$ is 1 or 2 by treatment with conventional oxidizing agents, and compounds of this invention where $c$ is The oxidation or reduction at the sulfur atom can take place in one step or two steps. For example, treatment of

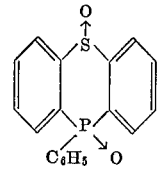

with one mole equivalent of hydrogen peroxide gives which can in turn be treated with an additional mole of H₂O₂ to yield

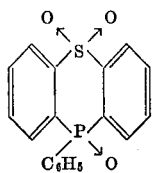

The same final product can be obtained in one step by treating the starting phenothiaphosphine oxide with two moles of hydrogen peroxide. In a similar manner, the compound

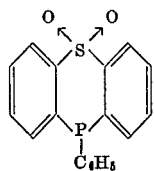

can be reduced with lithium aluminum hydride to

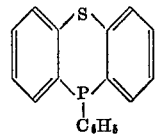

The compounds of this invention where $b$ is one and X is S or Se can be prepared by heating a compound of Formula A, D, E or F, wherein $b$ is zero, with sulfur or selenium in a hydrocarbon solvent. Alkali metal polysulfides or polyselenides can also be used instead of S or Se. The sulfides and selenides can be reduced to the phenothiaphosphines ($b$ is zero) in the same manner as the oxides by treatment with lithium aluminum hydride.

In connection with the oxidation-reduction reactions at the sulphur and phosphorus atoms of the phenothiaphosphines of this invention, it should be noted that oxidation or reduction takes place more easily at the phosphorus atom. Thus oxidation or reduction can take place selectively at the phosphorus site without affecting the sulfur site, for example reduction of oxygen bonded to phosphorus by means of silicon hydrides. However oxidation (or reduction) at the sulfur site will generally be acocmpanied by concurrent oxidation( or reduction) at the phosphorus site, unless the phosphorus atom is already in the oxidized (or reduced) state. As used in this paragraph, the term oxidized state of the phosphorus site includes phosphorus oxides, sulfides and selenides.

Compounds of Formulas A, D, E or F when $b$ is zero can be converted to quaternary phosphonium salts by reaction with organic halides, particularly halides represented by the formula RX, where R and X have the meanings defined with reference to Formulas A–E. The conversion to the quaternary phosphonium halide can be conveniently carried out by mixing together the compounds of Formulas A, D, E or F (where $b$ is zero) and the compounds of the formula RX in one of the inert liquid organic solvents described hereinabove, and heating the reaction mixture at a temperature between about 20° C. and about 120° C. until the quaternary phosphonium halide is produced. Other salts can be prepared from the halides by conventional ion exchange techniques. Typical salts of compounds of Formulas A, D, E or F are the following:

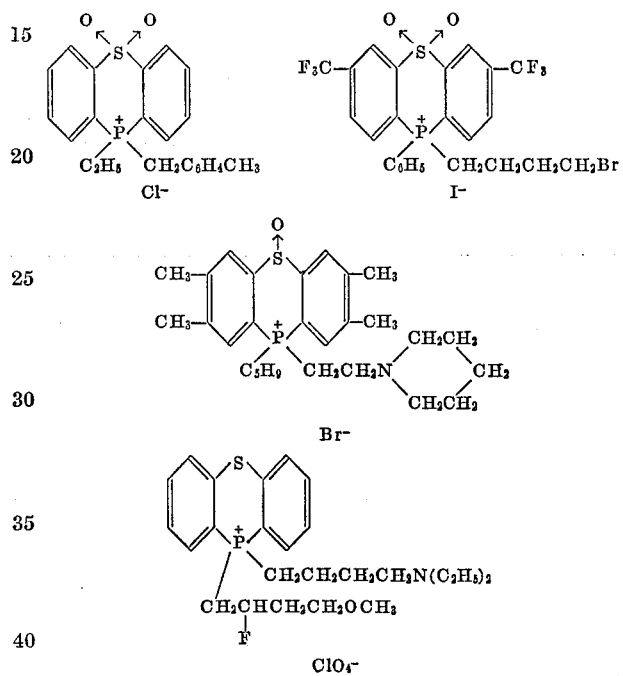

The process of this invention can also be carried out where phosphorus esters of the formula (I) 

are substituted for the halogen compounds of Formulas B and G. In addition, the process of this invention can be carried out by employing sulfur compounds of the formula (J) 

in place of the halogen compounds of Formulas B and G.

In Formulas I and J, R and $b$ have the meanings defined with reference to Formula B. Examples of the use of compounds of Formulas I and J in the process of this invention are illustrated in Table II hereinbelow.

TABLE II

| Reactant (1) | Reactant (2) | Product |
|---|---|---|
| $(CH_3O)_2PC_6H_5$ | ![structure] | ![structure] |
| $(C_6H_5CH_2O)_2P-CH_2C_6H_4CH_3$ $\downarrow$ $O$ | ![structure] | ![structure] |
| $(C_2H_5S)_2P-(CH_2)_3Br$ | ![structure] | ![structure] |
| $CH_3S$ $\phantom{CH_3S}\diagdown$ $\phantom{CH_3SS}P-C_2H_5$ $C_2H_5S\diagup \phantom{P}\diagdown O$ | ![structure] | ![structure] |

Compounds of Formulas A, D, E and F can be converted to other compounds of Formulas A, D, E and F by conventional chemical reactions, such as nitration, acylation and halogenation reactions, or by quaternization followed by chemical or electrochemical reduction. For example, treatment of the compound

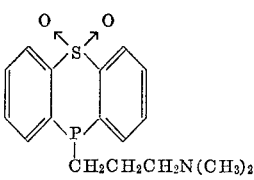

with nitric acid results in simultaneous nitration on the benzene rings and oxidation of the phosphorus atom to give, for example,

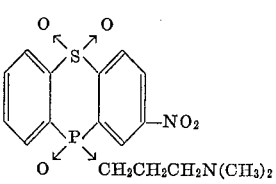

As another example, the compound

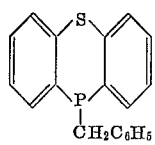

is treated with $BrCH_2CH_2SCH_2CH_2N(C_2H_5)_2 \cdot HBr$ to give the quaternary phosphonium salt which is then reduced electrochemically (the benzyl group is preferentially reduced) to give

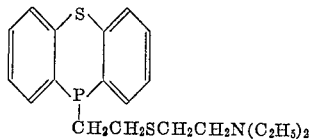

The compounds of Formulas A, D, E and F are useful as intermediates in the formation of metal chelating agents, the latter being further useful in recovering metal ions from solution. To produce the metal chelating agents, the compounds of Formulas A, D, E and F, wherein $b$ is zero and wherein the group attached to phosphorus is a substituted or unsubstituted phenyl, alkyl or benzyl group, are first reacted with lithium metal in one of the ether solvents described hereinabove to displace the group attached to phosphorus and produce a lithium derivative represented by the formula (K)   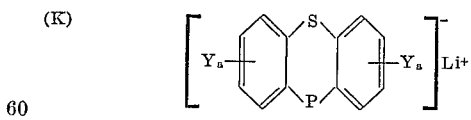

If $c$ is 1 or 2, reduction at the sulfur atom takes place during this step and in the lithium derivative $c$ is equal to zero.

The lithium derivative is next reacted with bromoacetic acid ethyl ester followed by hydrolysis of the ester to form compounds of the formula (L)   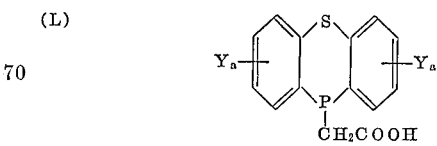

Compounds of Formulas A, D, E and F where $b$ is one are reduced by the methods described above prior to treatment with lithium metal and bromoacetic acid ethyl ester.

The compounds of Formula L form chelate complexes with transition metal cations such as $Fe^{+2}$, $Ni^{+2}$, $Co^{+2}$, $Cr^{+3}$, $Cu^{+2}$, $Fe^{+3}$ and the like. The compound of Formula L is added to an aqueous solution containing the transition metal cation, mixed thoroughly, and then the chelate complex is separated from the mixture by extraction with an organic solvent.

The compounds of Formulas A, D, E and F are also useful as microbiocidal agents, and are particularly effective against algae and fungi. For example, the compounds of this invention can be applied to textiles and fabrics to prevent damage by fungi, or the compounds (as quaternary phosphonium salts) can be added to water used in cooling systems to prevent growth of algae.

Another advantage of the phenothiaphosphines of this invention is that optically active phenothiaphosphines can be isolated and can then be maintained at room temperature for long periods of time without extensive racemization. This property is in contrast to the behavior of optically active phenothiazines which undergo extremely rapid racemization at room temperature.

The starting materials of Formulas B, C, G and H are known or can be prepared by known methods. For example, the compounds of Formula C or H where $c$ is 2 and Q is Li can be prepared by the method of Gilman et al., J. Am. Chem. Soc. 75, 278 (1953).

The compounds of Formulas C and H where $c$ is zero and Q is Li or MgBr are novel compositions of matter which can be prepared by the reaction of a compound of the formula (M)
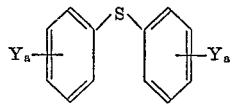

where Y and $a$ have the meanings defined hereinabove and not more than one position on each benzene ring ortho to the sulfur atom is occupied by a Y group, with butyllithium in ether solution. For example, the compound $C_6H_5SC_6H_5$ is reacted in diethyl ether with butyllithium in a 1:2 mole ratio to give the compound

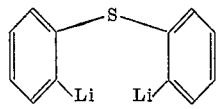

The presence of relatively inert groups such as monovalent hydrocarbon, fluorine, trifluoromethyl and the like on the benzenoid ring systems does not interfere with this process. The dilithium compound can be converted to the dibromide by reaction with bromine in a hydrocarbon solvent. The dibromide can then be converted to a compound of Formula C or H wherein $c$ is zero and Q is MgBr by reaction with magnesium according to conventional methods for producing Grignard reagents.

The following examples further illustrate the processes and compositions of this invention.

EXAMPLE 1

O,O′-dilithiodiphenylsulfone was made by adding over a 20 minute period two moles of butyl lithium in petroleum ether (commercial stock solution) to a suspension of one mole of diphenylsulfone in diethyl ether at −30/−25° C. After stirring the orange red mixture for 3–4 hours at −25/−30° C., one mole of $C_6H_5PCl_2$ was added rapidly, the cooling bath taken away and the temperature allowed to rise for about 10 minutes. Benzene and aqueous NaOH were added. The oily residue of the organic layer was heated at about 100° C. under vacuum ($10^{-2}$–$10^{-3}$ mm. Hg) in order to remove volatile compounds. The remaining residue was taken up with a small amount of hot acetic acid; upon cooling 10-phenyl-5,5-dioxyphenothiaphosphine (Compound I) crystallized out, colorless crystals of M.P. 155.5–156.5° C.

Compound I

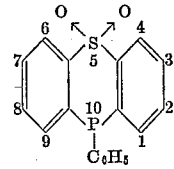

EXAMPLE 2

To a solution of 7.25 g. of 5,5-dioxy-10-phenyl-phenothiaphosphine (Compound I) in 200 ml. of dibutyl ether, was added 82.5 ml. of a 0.83 molar solution of $LiAlH_4$ in diethyl ether. The ether was then distilled off until the reaction temperature reached 99–100° C. and reflux at this temperature was continued for 3 hours. After addition of water and aqueous sodium tartrate, the mixture was extracted with methylene chloride and the dried organic layer evaporated. The residue was crystallized from methanol yielding 3 g. (46%) of 10-phenyl-phenothiaphosphine, Compound II, colorless crystals of M.P 74–76° C. or 92–93° C.

Analysis.—Found: C, 73.92; H, 4.64. Calc. for $C_{18}H_{13}PS$: C, 73.96; H, 4.48.

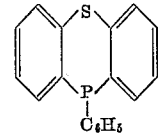

EXAMPLE 3

To a solution of 18.6 g. (0.1 mole) of diphenyl sulfide in 250 ml. dry ether, was added 0.3 mole n-butyllithium in petroleum ether. After 5–6 days refluxing, 17.9 g. (13.8 ml., 0.1 mole) of $C_6H_5PCl_2$ in 100 ml. dry ether were added slowly to the solution of O,O′-dilithiodiphenylsulfide. After the exothermal reaction had ceased, reflux was continued for one hour, water and benzene (0.51) were added, the organic layer dried on $Na_2SO_4$ and the solvents evaporated. The remaining oil was chromatographed on alumina and elution with benzene yielded 5.15 g. (17.6%) of colorless crystals (M.P. 92–93° C., from ethanol) of 10-phenylphenothiaphosphine, Compound II. Identity of this compound with the one of Example 2 was further established by comparison of their infrared spectra.

EXAMPLE 4

A solution of 10-phenyl-phenothiaphosphine in benzene is refluxed for 1 hour with an excess of $CH_3I$. The phosphonium iodide having the formula

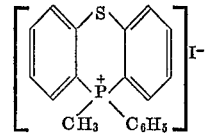

was filtered off; the pale yellow plates (quantitative yield) melt at 250–260° C.

Analysis.—Found: C, 51.67; H, 3.80; I, 28.29. Calc. for $C_{19}H_{16}IPS$: C, 52.54; H, 3.71; I, 29.22.

EXAMPLE 5

5,5 - dioxy - 10 - methyl - 10 - phenyl - phenothiaphosphonium iodide was obtained quantitatively by the method of Example 4, from $CH_3I$ and 5,5-dioxy-10-phenyl-phenothiaphosphine. The yellow crystals melt at 285–290° C.

Analysis.—Found: C, 48.71; H, 3.71. Calc. for $C_{19}H_{16}IO_2PS$: C, 48.88; H, 3.45.

EXAMPLE 6

A solution of 0.2 mole of n-butyl lithium in petroleum ether was added in one portion to a suspension of 0.1 mole (25.2 g.) of p-chlorodiphenylsulfone in 1.9 liters dry diethyl ether cooled at −40° C. After 4 hours stirring at −40° C., 0.1 mole of C₆H₅PCl₂ was added, causing discoloration of the orange solution of O,O'-dithio - p - chlorodiphenylsulfone. The reaction mixture was further treated by the addition of water, extraction, evaporation of the solvents and crystallization of the residue from acetic acid and from methanol. The yield of 2 - chloro - 5,5 - dioxy - 10 - phenylphenothiaphosphine, M.P. 193–194° C., was 42%.

*Analysis.*—Found: C, 60.29; H, 3.58; Cl, 9.96. Calc. for $C_{18}H_{12}ClO_2PS$: C, 60.25; H, 3.37; Cl, 9.88.

EXAMPLE 7

In a 5 liter vessel, equipped with a stirrer, a condenser and a nitrogen inlet tube, 2.5 liters dry diethyl ether and 75.5 g. (0.35 mole) diphenylsulfone were mixed. After the suspension was cooled to −30° C., a petroleum ether solution containing 0.7 mole n-butyllithium was added. After 5½ hours stirring at −30° C., the reaction mixture was cooled to −60° C. and 0.385 mole (48 ml. or 115 g.) of Br₂PCH₂CH₂Br were added. The reaction mixture was allowed to warm to room temperature and the desired product was recovered by converting it to a water soluble phosphonium salt as follows: 100 ml. of diluted sulfuric acid (10%) was added, followed by 150 ml. of aqueous formaldehyde (35%) and 150 ml. conc. HCl. The mixture was stirred vigorously for 3 hours. The aqueous layer containing the hydromethylphosphonium chloride (a compound of this invention) of the formula

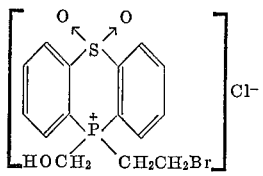

was separated from the organic phase and neutralized under cooling with NaOH, avoiding temperatures above 15–20° C. The liberated phosphine was extracted with methylene chloride, the organic layer washed with aqueous NaHSO₃, then with water, dried over Na₂SO₄ and the solvent evaporated. The yellow oil product was chromatographed over alumina; the fractions eluted with CH₂Cl₂; and Et₂O respectively, were concentrated, yielding crystals of M.P. 110–130° C. Recrystallization from CH₂Cl₂/CH₃OH in the cold gave pure crystals (M.P. 142–143° C.) of 10-(2'-bromo-ethyl)-5,5-dioxy-phenothiaphosphine.

*Analysis.*—Found: C, 47.45; H, 3.45; Br, 21.65. Calc. for $C_{14}H_{12}BrO_2PS$: C, 47.34; H, 3.40; Br, 22.49.

When this compound was heated (in warm acetic acid), cyclic dimerization occurred readily, giving the diphosphonium compound (M.P. 293–298° C.) having the formula:

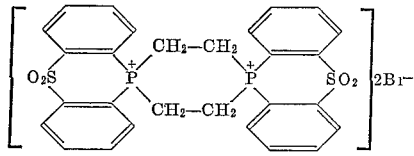

EXAMPLE 8

10-(2'-bromoethyl)-5,5-dioxyphenothiaphosphine (8 g.) and 20 g. KCN were stirred for 5 hours at room temperature in 150 ml. of dimethylsulfoxide. Water and benzene were added, the organic layer evaporated and the crystalline residue recrystallized from methanol (or ether); the colorless crystals of 10-(2'-cyanoethyl)-5,5-dioxyphenothiaphosphine (76% yield) melt at 152–153° C.

*Analysis.*—Found: C, 59.90; H, 4.18; N, 4.42. Calc. for $C_{15}H_{12}NO_2PS$: C, 59.78; H, 4.01; N, 4.64.

EXAMPLE 9

6 g. of the nitrile product of Example 8 was added to a cooled (−15° C.) solution of 1.5 g. of LiAlH₄ in 200 ml. diethyl ether. The solution was stirred for ½ hour below 0°. The mixture was then poured in ice water containing sodium potassium tartrate. The amine product was extracted several times with benzene and methylene chloride. The residue left after evaporation of the solvents was distilled in a molecular still at 160° C./0.001 mm. Hg, yielding a viscous oil, 10-(3'-aminopropyl)-5,5-dioxyphenothiaphosphine, of the structure

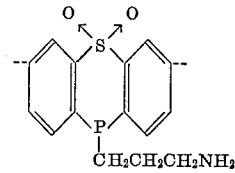

EXAMPLE 10

One gram of 5,5-dioxy-10-phenylphenothiaphosphine was dissolved in acetone and 20 ml. of 20% aq. hydrogen peroxide were added. After ½ hour heating on a water bath, the reaction mixture was diluted with ⅓ of water. Colorless crystals of 5,5,10-trioxy-10-phenyl-phenothiaphosphine (M.P. 246–247° C.) crystallized out.

*Analysis.*—Found: C, 62.92; H, 3.86. Calc. for $C_{18}H_{13}O_3PS$: C, 63.53; H, 3.85.

EXAMPLE 11

3 g. of 5,5-dioxy-10-phenyl-phenothiaphosphine and 0.3 g. of sulfur were refluxed for 2 hours in xylene. By cooling, well shaped crystals (M.P. 215–216° C., 2 g.) of 5,5-dioxy-10-phenyl-phenothiaphosphine sulfide were obtained.

*Analysis.*—Found: C, 61.51; H, 3.93. Calc. for $C_{18}H_{13}O_2PS_2$: C, 60.66; H, 3.67.

EXAMPLE 12

10-phenyl-phenothiaphosphine (2 g.) and 1.5 g. of sulfur were heated for 3 hours in 100 ml. of boiling benzene. Sodium sulfide (2 g., as enneahydrate) in 10 ml. water were added and reflux was continued for one hour. The organic layer gave 2 g. of colorless crystals (M.P. 200–201° C.) of 10-phenyl-phenothiaphosphine sulfide.

*Analysis.*—Found: C, 66.13; H, 3.98. Calc. for $C_{18}H_{13}PS_2$: C, 66.64; H, 4.04.

EXAMPLE 13

A mixture of 50 g. of diphenylsulfone (0.23 mole) and 287 ml. of a 1.75 N solution of n-butyl lithium (in petroleum ether, 0.5 mole) in 1.6 liters of dry diethyl ether was stirred at −25° C. for 4 hours in a nitrogen atmosphere. This cold mixture was added over half an hour to a solution of 35.7 g. of CH₃P(O)Cl₂ in dry diethyl ether and the resulting solution refluxed for ½ hour. Water was added, the ether layer was separated from a second organic layer and a water layer, and yielded 13.5 g. of unreacted diphenylsulfone. The second organic layer was extracted with methylene chloride, dried, and evaporated, giving 7.8 g. of 5,5,10-trioxy-10-methyl-phenothiaphosphine. Recrystallization from methanol gave colorless crystals of M.P. 257–257.5° C.

*Analysis.*—Found: C, 56.10; H, 4.26. Calc. for $C_{13}H_{11}O_3SP$: C, 56.11; H, 3.98.

EXAMPLE 14

A petroleum ether solution of n-butyl lithium (1 mole, 605 ml. of a 1.66 N solution) was added to 62 g. (0.333 mole) of diphenylsulfide dissolved in 600 ml. of dry diethyl ether and the mixture refluxed for 3–4 days. This mixture was then added over a period of one hour to 62 g. (0.5 mole) of CH₃P(O)(OCH₃)₂ diluted with 750 ml. of diethyl ether. The reaction mixture was refluxed for 3 hours. Dilute hydrochloric acid was added until the mixture was acid. The dried organic layer gave an oil which was chromatographed over alumina. The fraction eluted with benzene yielded 42.8 g. of unreacted diphenylsulfide. The last fraction, eluted with ethyl acetate/methanol gave 5 g. of an oil which was distilled at $10^{-3}$ mm. Hg (B.P.≈140° C.) and crystallized slowly from ether/petroleum ether, M.P. 112–113° C. Elemental analysis and infrared spectra show the compound to be 10-methyl-10-oxy-phenothiaphosphine,

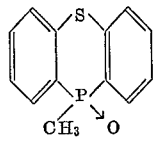

*Analysis.*—Found: S, 12.61. Calc. for $C_{13}H_{11}OPS$: S, 13.02.

EXAMPLE 15

A solution of 10-phenyl-phenothiaphosphine (6 g.) in 100 ml. of dry tetrahydrofuran was cooled at −20° C. in a nitrogen atmosphere and an excess of Li shavings was added. The mixture was stirred for one hour at the same temperature, yielding a dark solution of lithium phenothiaphosphide

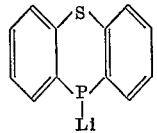

The excess of Li was removed by filtration and the red filtrate was added to a solution of

(100% excess). The mixture was stirred for one hour at room temperature and hydrolyzed. The methylene chloride extracts were chromatographed over alumina. The methanol fraction was evaporated, the residue taken up with dilute HCl, and the mixture extracted with $CH_2Cl_2$. The aqueous layer was made alkaline and extracted with $CH_2Cl_2$. The organic layer was evaporated and the residue distilled at 140° C. ($10^{-2}$ mm. Hg) in a molecular still yielding 10-(3′-dimethylaminopropyl)-phenothiaphosphine of the formula

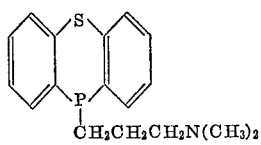

*Analysis.*—Found: C, 67.71; H, 7.06; N, 4.62; M.W.: 294. Cal. for $C_{17}H_{20}NPS$: C, 67.74; H, 6.69; N, 4.65, M.W.: 301.4.

EXAMPLE 16

A suspension of 36.3 g. of diphenylsulfone, 0.33 mole of n-butyl lithium in one liter of dry diethyl ether was stirred at −25° C. for 3½ hours. The mixture was cooled at −70° C. and 0.25 mole of trimethylphosphite

was added. The mixture was refluxed for 2½ hours and poured into dilute HCl. Separation of the reaction mixture gave 2 g. of unreacted diphenylsulfone, 2.2 g. dibenzothiophene dioxide, and 5,5-dioxyphenothiaphosphonic acid having the structure

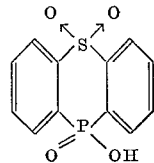

in the form of colorless crystals of M.P. 346–351° C. (from acetic acid).

*Analysis.*—Found: C, 51.34; H, 3.31; S, 11.79. Calc. for $C_{12}H_9O_4PS$: C, 51.43; H, 3.23; S, 11.44.

EXAMPLE 17

O,O′-dilithiodiphenylsulfide was prepared as in Example 3 from one mole butyl lithium and 0.5 mole $(C_6H_5)_2S$. The solution was cooled to −80° C. and one mole of bromine (in 200 ml. benzene) was added slowly. The mixture was allowed to warm to room temperature. Aqueous $NaHSO_3$ was added and the organic layer dried on $Na_2SO_4$. The oily residue was distilled, giving unreacted diphenyl sulphide (B.P. 150–170° C./10 mm. Hg), O-bromodiphenylsulfide (B.P. 184–186° C./10 mm. Hg) and a residue, which was chromatographed on alumina. The benzene fraction was distilled in a molecular still, giving at 110° C./$10^{-2}$ mm. Hg, O,O′-dibromodiphenylsulfide, which crystallized slowly. Recrystallization from ethanol gave well shaped crystals of M.P. 72–73° C.

*Analysis.*—Found: Br. 45.83. Calc. for $C_{12}H_8Br_2S$: Br. 46.45.

EXAMPLE 18

One gram of O,O′-dibromodiphenylsulfide in 20 ml. dry diethyl ether was stirred overnight with 0.143 g. magnesium turnings, leaving almost no Mg and producing the compound

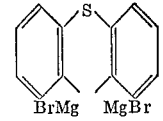

The digrignard reagent treated with $C_6H_5CH_2PCl_2$ to give 10-benzyl-phenothiaphosphine (M.P. 82–89° C.).

EXAMPLE 19

Bromine (32 g., 0.2 mole) was added dropwise to a solution of 22.2 g. (0.1 mole) of 4,4′-difluorodiphenylsulfide and about 20 g. (0.075 mole) of $AlBr_3$ in 80 ml. of nitromethane kept at 60–80° C. After the evolution of HBr has ceased, heating was continued for ½ hour. The reaction mixture was poured in aqueous $NaHSO_3$ and the residue of the evaporated organic phase crystallized from ethanol, yielding 33 g. (87%) of 2,2′-dibromo-4,4′-difluorodiphenylsulphide, M.P. 86.5–87° C.

*Analysis.*—Found: C, 37.84; H, 1.71; S, 8.65. Calc. for $C_{12}H_6Br_2F_2S$: C, 37.92; H, 1.59; S. 8.44.

A solution of 20 g. (0.0526 mole) of 2,2′-dibromo-4,4′-difluorodiphenylsulphide in 150 ml. dry tetrahydrofuran was added slowly to 2.56 g. (0.105 gram atom) magnesium turnings in 50 ml. of the same solvent. The magnesium was activated at the start by adding a few drops of $BrCH_2CH_2Br$. The reaction mixture soon started refluxing and after two hours stirring, the consumption of Mg was almost complete. To this Grignard reagent, 10.2 g. (0.0526 mole) of benzyldichlorophosphine in 50 ml. of tetrahydrofuran were added. The mixture was poured into water; the benzene extracts were concentrated and the residue crystallized from ethanol, yielding 9.95 g. (55%) of analytically pure crystals (M.P. 92.5–95° C.) of 10-benzyl-2,8-difluorophenothiaphosphine.

*Analysis.*—Found: C, 66.60; H, 4.05. Calc. for $C_{19}H_{13}F_2PS$: C, 66.47; H, 3.83.

EXAMPLE 20

A mixture of 2.47 g. (0.0072 mole) of 10-benzyl-2,8-difluorophenothiaphosphine, 2.72 g. (0.008 mole) of $ICH_2CH_2CH_2N(CH_3)_2 \cdot HI$ and 6 ml. benzonitrile was heated for 6 hours at 100° C. in a closed system. The phosphonium salt of the formula

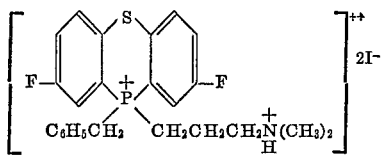

crystallized out quantitatively after cooling (M.P. 220–260° C.) Two grams of this phosphonium salt were treated with $CH_2Cl_2$ and wet sodium bicarbonate in order to liberate the free amine. The methylene chloride phase was evaporated to dryness and the residue, dissolved in methanol/water, electrochemically reduced, using a mercury cathode and a graphite anode (surrounded by a semipermeable membrane). The electrolysis was conducted at 90° C. under an E.M.F. of 20–25 v. After one hour, the reduction was stopped. Extraction with methylene chloride and evaporation of the solvents of the organic layer left 0.6 g. (60% yield) of a heavy oil which analyzed for 10-(3′-dimethyl-aminopropyl)-2,8-difluorophenothiaphosphine. The infrared spectrum was consistent with the above structure.

*Analysis.*—Found: C, 59.87; H, 5.58; N, 3.76. Calc. for $C_{17}H_{18}F_2NPS$: C, 60.53; H, 5.37; N, 4.15.

The above phenothiaphosphine was converted into its P-sulfide as described in Example 19.

*Analysis.*—Found: S, 17.24. Calc. for $C_{17}H_{18}F_2NPS_2$: S, 17.35.

What is claimed is:
1. A compound of the formula:

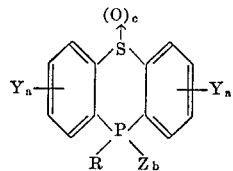

wherein each $a$ individually represents a number from 0 to 1 when Y is F, Cl, $CF_3$ or CN, wherein each $a$ individually represents a number from 0 to 4 when Y is lower alkyl, phenyl, or benzyl, wherein $b$ represents zero or one, wherein $c$ represents zero, one or two, wherein Y represents F, Cl, $CF_3$, CN, lower alkyl, phenyl, or benzyl, wherein Z represents oxygen or sulfur, and wherein R represents alkyl of up to 18 carbon atoms, phenyl, phenylalkyl wherein the alkyl has up to two carbon atoms, cycloalkyl of from five to seven carbon atoms, or lower alkyl substituted with a member of the group consisting of halo, cyano, amino, and N,N-dimethylamino.

2. 5,5-dioxy-10-(3-aminopropyl)phenothiaphosphine.
3. 10-(3-dimethylaminopropyl)phenothiaphosphine.
4. 10-(3 - dimethylaminopropyl) - 2,8 - difluorophenothiaphosphine.
5. 5,5-dioxy-10-phenylphenothiaphosphine.

References Cited

Organic Synthesis, Migrdichian, 1957, vol. I, pp. 605–606.

Freedman et al., Journal of Organic Chemistry, 1964, vol. 29, pp. 1983–1985.

Rochow et al., The Chemistry of Organometallic Compounds, 1958, p. 293.

CHARLES B. PARKER, *Primary Examiner.*

S. T. LAWRENCE, *Assistant Examiner.*

U.S. Cl. X.R.

71—67, 86; 252—8.6, 8.8; 260—239, 268, 293, 293.4, 438, 439, 464, 465, 465.7, 515, 516, 563, 570.6, 583, 606.5, 607, 609, 999